Oct. 17, 1961 W. R. AIKEN 3,005,127

ELECTRONIC DEVICE

Filed April 27, 1955 6 Sheets-Sheet 1

INVENTOR.
WILLIAM R. AIKEN
BY James E. Toomey
ATTORNEY

INVENTOR.
WILLIAM R. AIKEN
BY James E. Toomey
ATTORNEY

Oct. 17, 1961 W. R. AIKEN 3,005,127

ELECTRONIC DEVICE

Filed April 27, 1955 6 Sheets-Sheet 3

INVENTOR.
WILLIAM R. AIKEN
BY James E. Toomey
ATTORNEY

Oct. 17, 1961 W. R. AIKEN 3,005,127

ELECTRONIC DEVICE

Filed April 27, 1955 6 Sheets-Sheet 4

INVENTOR.
WILLIAM R. AIKEN
BY James E. Toomey
ATTORNEY

Oct. 17, 1961 W. R. AIKEN 3,005,127

ELECTRONIC DEVICE

Filed April 27, 1955 6 Sheets-Sheet 5

INVENTOR.
WILLIAM R. AIKEN

BY James E. Toomey

ATTORNEY

Oct. 17, 1961 W. R. AIKEN 3,005,127

ELECTRONIC DEVICE

Filed April 27, 1955 6 Sheets-Sheet 6

INVENTOR.
WILLIAM R. AIKEN
BY James E. Toomey
ATTORNEY

United States Patent Office 3,005,127

Patented Oct. 17, 1961

3,005,127

ELECTRONIC DEVICE

William R. Aiken, Los Altos, Calif., assignor, by mesne assignments, to Kaiser Industries Corporation, a corporation of Nevada Filed Apr. 27, 1955, Ser. No. 504,281

26 Claims. (Cl. 315—13)

Figures 1, 2:
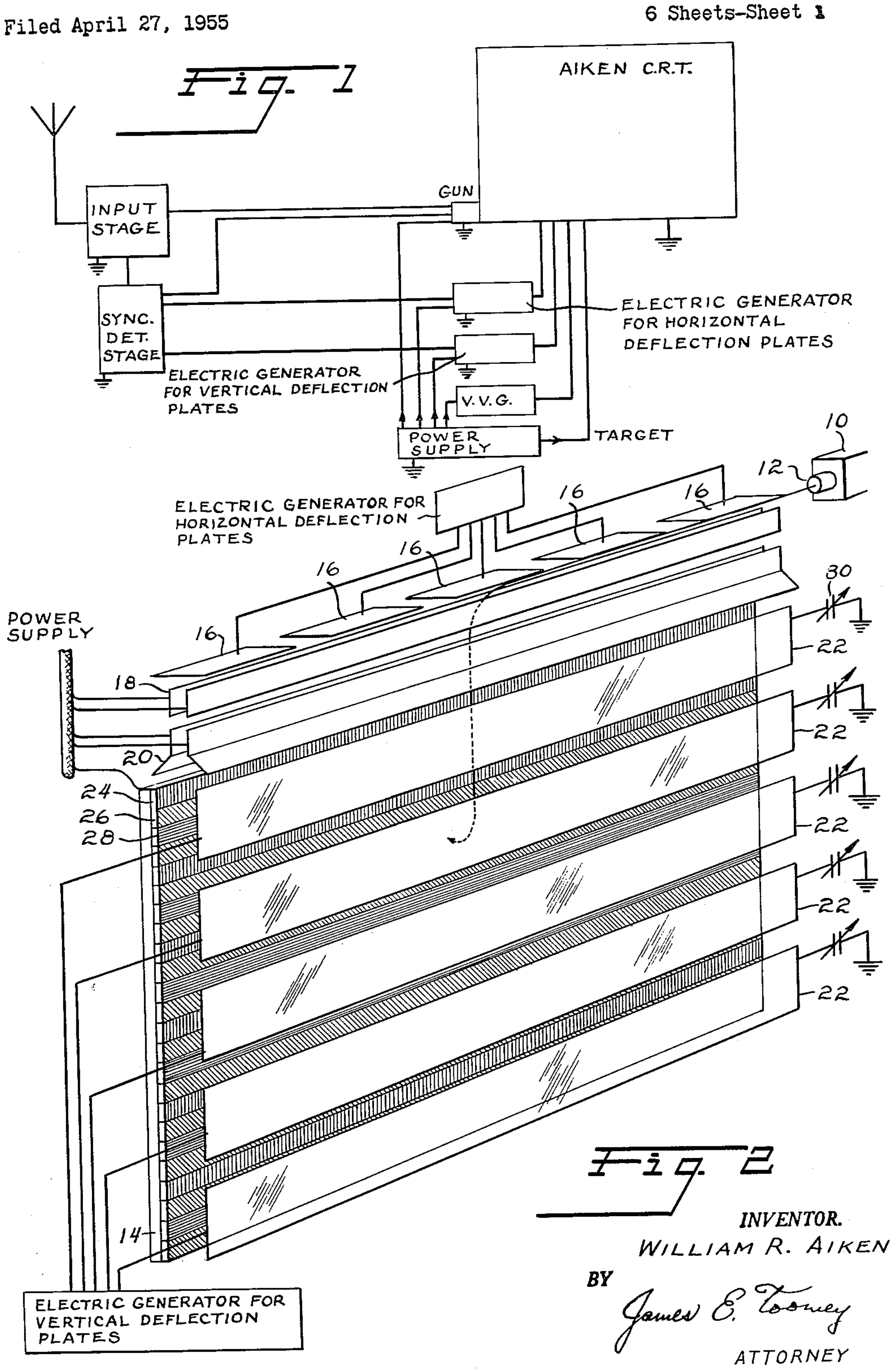

The invention relates to cathode ray tubes for the display of polychrome television images directly upon the viewing surface of the tube. This invention is a modification and an improvement of the cathode ray tubes disclosed in the Patent No. 2,795,731 which issued on June 11, 1957, to W. R. Aiken.

The patent, referred to above, discloses cathode ray tubes which are relatively shallow or flat; or in other words have a relatively small depth dimension as compared to the conventional cathode ray tubes. The tubes described therein, as well as the tube which comprises the present invention, utilize a novel electrostatic deflection system. Briefly, the system is one wherein an electron sensitive image screen is provided. A conventional electron gun is employed for delivering an electron beam in a path which is in proximate relation with said image screen. Horizontal deflection means may be provided which are operable to deflect the electron beam successively along its length to various portions of the area adjacent the image screen, and vertical deflection means are operable to deflect the beam from the area adjacent the image screen at successive intervals toward various portions of the screen in synchronized relation with the horizontal deflection system to effect a frame scan.

The present invention is concerned with a cathode ray tube utilizing the above-referred to electrostatic deflecting means in combination with a novel image screen which in combination results in the production of a television picture in color.

An object of the present invention is to produce a cathode ray tube capable of exhibiting television pictures in color which tube has a substantially small depth dimension thereby necessitating the occupation of considerably less space than the conventional cathode ray tubes.

Another object of the invention is to produce a cathode ray tube capable of exhibiting television pictures of the original scene in color which tube is extremely stable in its ability to resolve the transmitted image in true color fidelity.

Still a further object of the present invention is to produce a cathode ray tube which has a relatively simple structure thereby being readily and economically manufactured.

The instant invention incorporates substantially the same fundamental deflection principles as those set forth in the above patent. It differs, however, in the specific image screen construction and the various embodiments thereof. Considering the invention broadly, it contemplates an image screen which is comprised of a plurality of groups of strips of fluorescent material disposed in parallel adjacent relationship to one another. Each strip of each group is capable of emitting light of a frequency which the human retina perceives as red, blue or green when such strips are excited by an impinging stream of electrons. These primary colors are referred to in the color television field as being the so-called "additive primaries." With these primaries combined in proper proportions, it is possible to reproduce any of the hues of the visible spectrum. However, it must be understood, that with only three primary colors it is not possible to reproduce all the spectrum colors exactly, but the color match can be made so closely that only simultaneous inspection of the original color and the reproduction would reveal the difference.

Since at least three primary colors must be used to achieve realistic color reproductions, it follows that three color images must be transmitted by a color-television transmitting system. The three color images are transmitted in sequence, hence the name "sequential color television system" has been applied. In the dot-sequential system, the primary colors are assigned to successive dots of the image. In line-sequential systems, the primary colors are assigned to successive lines of the image. In the field-sequential system, the colors are assigned to successive fields of the image.

It is sufficient to point out here and it will be manifest to those skilled in the art that three separate images, one in each of the primary colors, must be dissected in a particular sequence at the transmitter and reassembled in the same sequence at the receiver. The dissecting and reassembly processes are performed so rapidly that the primary colors are not separately perceived one after the other, but appear to the observer to blend or "fuse," as though they existed simultaneously. Thus, while it is true that only one primary color is actually present on the receiver screen at any one instant in each of the three sequential systems, persistence of vision causes the picture screen to appear as if all three primary colors were present simultaneously throughout the area of the screen. Accordingly, it is concluded that a color television image is equivalent to three images superimposed one on top of the other, each image being made up of light of one of the primary colors.

In accordance with the broadest aspect of the present invention, there is provided an image screen having one of its surfaces coated with a plurality of adjacent parallel strips of phosphor material arranged such that one strip is capable of emitting red light, the next blue light, and the third green light when excited by an impinging beam of electrons. A plurality of optically transparent deflection electrodes is interposed between the image screen and the viewer, and each of the electrodes is arranged in parallel relation with respect to the others. A plurality of horizontal deflection electrodes is provided to be disposed along and spaced from one of the marginal edges of the image screen. An electron source is provided to deliver a beam of electrons along a path adjacent to and substantially coextensive with the horizontal deflection electrodes. Upon suitable successive energization of the horizontal deflection electrodes, the beam is caused to be successively deflected to the zone defined by the image screen and the transparent deflection electrodes. When the transparent deflection electrodes are suitably energized the beam is caused to be driven or repelled toward and impinge upon the image screen. It will be discerned that by proper synchronized energization of the horizontal and vertical deflection means, the electron beam may be caused to impinge on the image screen to form a single line, in which case it would be referred to as a line scan or the beam may be successively caused to be deflected in such to form a frame scan providing a complete television picture. During a single frame scan in color television reception, the energization of the horizontal and vertical deflection means is such to cause the electron beam to strike or impinge upon the phosphor material capable of emitting a single additive primary color.

Figures 3, 4:
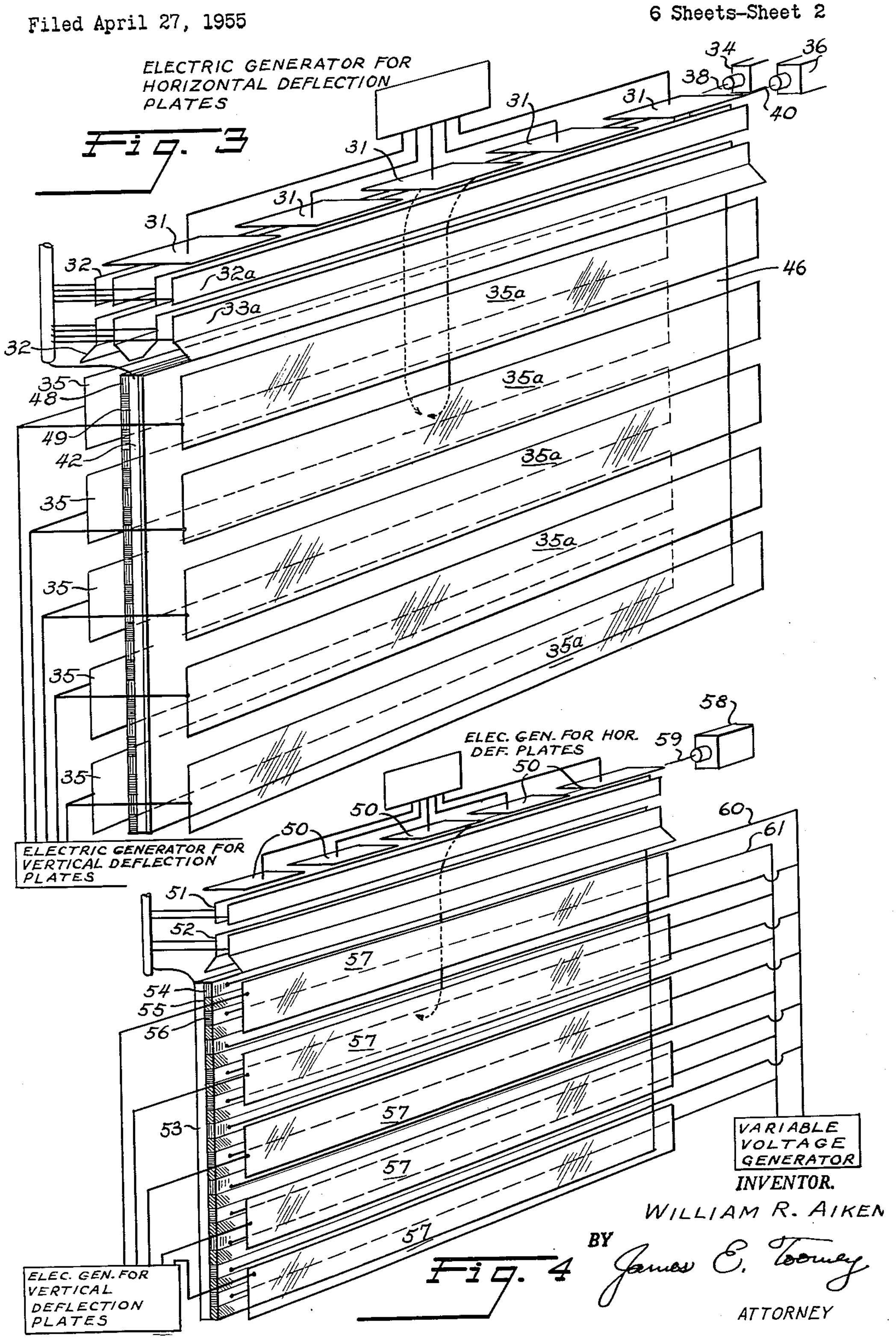
Figure 5:
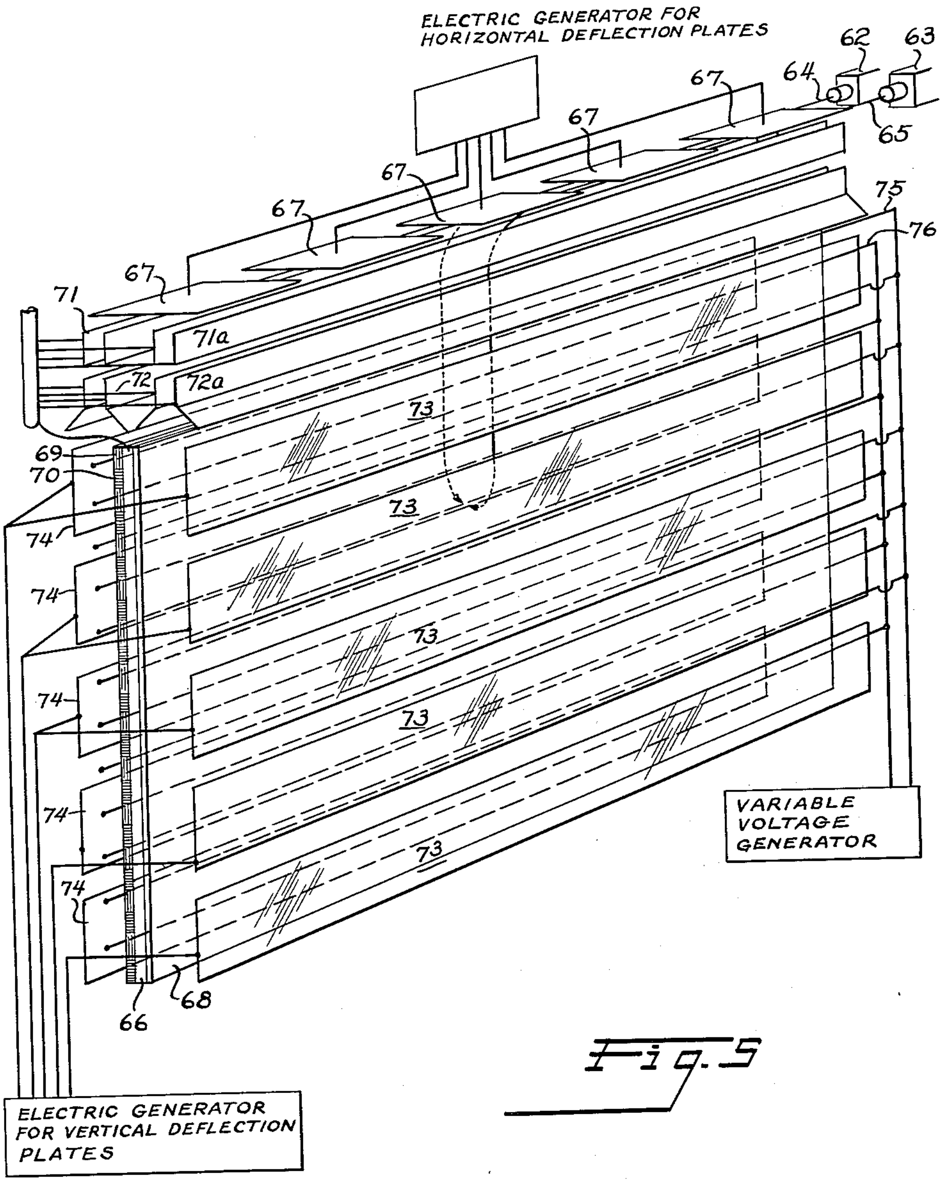
Figure 6:
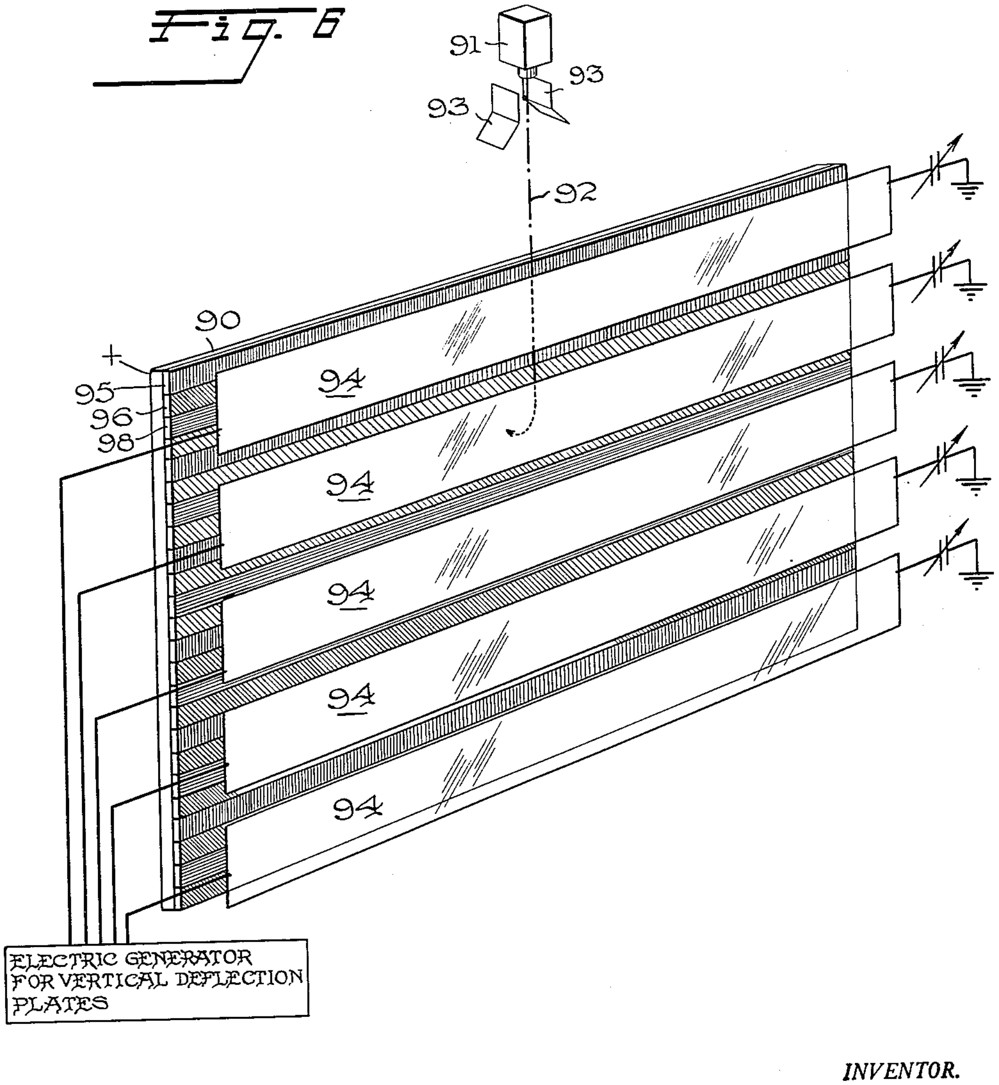
Figure 7:
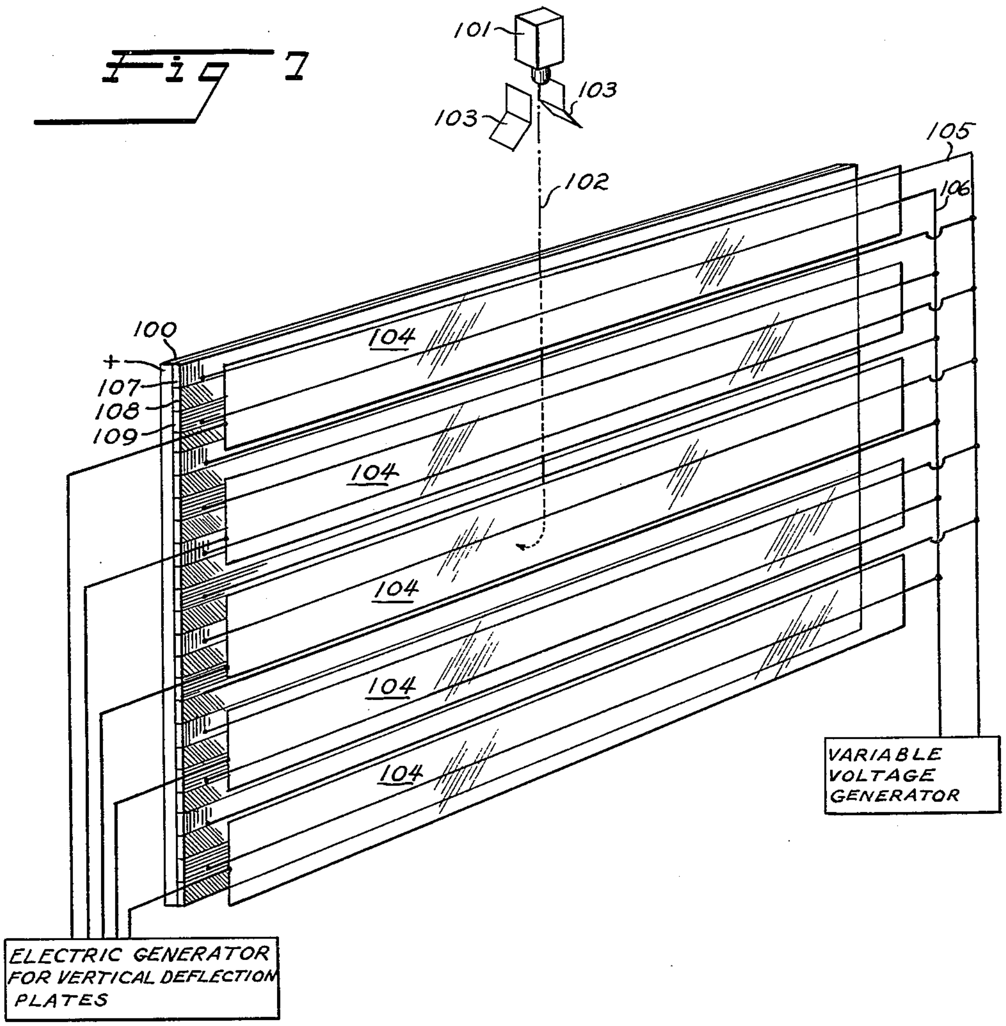
Figure 8:
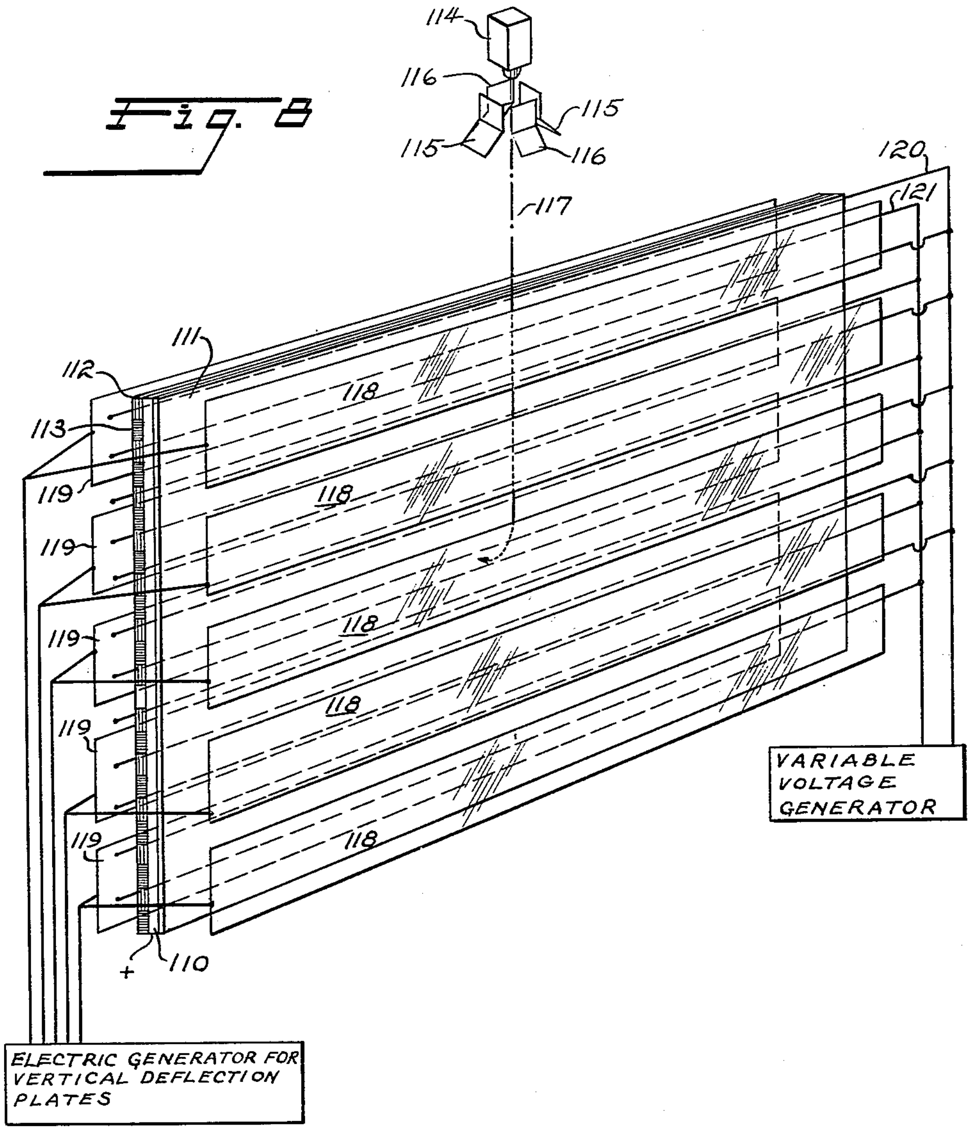

The invention will be described hereinafter in detail illustrating several embodiments. It must be understood, however, that there may be variations of the specific embodiments herein described without departing from the scope of the invention which is set forth in particularity in the appended claims. The invention will now be described by way of example with reference to the accompanying drawings wherein:

FIGURE 1 is a block diagram showing a system in which the present tube may satisfactorily be incorporated, FIGURE 2 is a perspective view of the components of the cathode ray tube showing the deflection elements and the image screen, one surface of which is coated with a fluorescent material, FIGURE 3 is a perspective view of the components of the cathode ray tube employing two sources of electrons showing the deflection elements and the image screen having two surfaces coated with a fluorescent material, FIGURE 4 is a perspective view of the components of the cathode ray tube showing the deflection elements and the image screen wherein supplemental focusing means are provided, FIGURE 5 is a perspective view of the components of the cathode ray tube employing two sources of electrons showing the deflection elements and the image screen having two surfaces coated with a fluorescent material wherein supplemental focusing means are provided adjacent one surface of the image screen, FIGURE 6 is a perspective view of the components of the cathode ray tube showing the vertical deflection elements, the image screen, and the electron source disposed in spaced relation with respect to the horizontal marginal edge of the image screen, FIGURE 7 is a perspective view of the components of the cathode ray tube showing the vertical deflection elements, the image screen, the electron source disposed in spaced relation with respect to the horizontal marginal edge of the image screen, and supplemental focusing means between the deflection elements and the image screen, and FIGURE 8 is a perspective view of the components of the cathode ray tube showing the vertical deflection elements, the image screen having two surfaces coated with a fluorescent material wherein supplemental focusing means are provided adjacent one surface thereof, and the electron source disposed in spaced relation with respect to the horizontal marginal edge of the image screen.

FIGURE 1 broadly shows in block form a system incorporating the Aiken-type cathode ray tube which is adapted to produce television displays in color. The transmitted television signal is adapted to be fed to the input stage of the system through an antenna as shown. It will be obvious to those skilled in the art that the system may be of the closed circuit type television system as well as the type of system illustrated in FIGURE 1. The input stage provides the control grid of the electron gun of the Aiken tube with a video signal and also provides a signal to the sync detection stage. The sync detection stage of the system is adapted to send pulses of electrical energy to the electron gun to properly control the energization thereof and also properly controls the operation of the electric generators which energize the horizontal and vertical deflection electrodes of the Aiken tube.

A power supply is provided to supply the necessary operating potentials to the electron gun, the electric generator for the horizontal deflection electrodes, the electric generator for the vertical deflection electrodes and also for supplying the proper positive potential to the target of the tube. In the embodiments of the present invention shown in FIGURES 4, 5, 7 and 8, a variable voltage generator is provided to achieve the proper energization of the electron lens arrangements employed therein.

A single line in the block diagram may represent a number of conductors for high voltage, low voltage, etc. Further it should be pointed out that it was deemed advisable to illustrate the electron gun of FIGURE 1 disposed at the lower left hand corner of the block representing the Aiken cathode ray tube; however, in the other figures showing the specific embodiments of the tube the electron gun is disposed at the upper right hand corner. This rearrangement of components may be readily achieved without avoiding the scope of the present invention.

In one embodiment of the invention, shown in FIGURE 2, there is an electron sensitive material coated on the surface of an optically transparent and electrically conductive supporting plate 14. An electron beam source 10, which may be an electron gun of conventional design, is arranged above and slightly offset from the electron sensitive coating and positioned relative thereto to impart to the electron beam 12 an initial trajectory in substantially parallel proximity with the upper edge of the supporting plate 14.

The horizontal sweep deflection system illustrated in FIGURE 2 comprises a plurality electrostatic deflection elements 16 which upon suitable negative potential energization with respect to the beam potential will cause the beam 12 to be deflected downwardly at a substantial angle. The beam 12 is then caused to enter an accelerating field established by a slotted accelerator electrode 18. Disposed beneath the slotted accelerator electrode 18, there is a focusing skirted electrode structure indicated as 20. The electrostatic fields established by the electrodes 18 and 20 will cause the beam trajectory to be further deflected and delivered to various zones parallel and adjacent to the image screen in a substantially vertical direction. In one embodiment, a horizontal deflection system of the type described operated satisfactorily with eleven deflection elements 16, although as will be apparent to those skilled in the art the number of elements employed may be varied without departing from the scope of the invention.

The vertical sweep deflection system illustrated in FIGURE 2 comprises a plurality of transparent electrically conducting deflection elements 22 arranged substantially parallel and adjacent to the supporting plate 14 and spaced therefrom a distance to permit passage of the successive, continuous substantially vertical trajectories of electron beam 12 therebetween. As indicated, diagrammatically in the drawing, the electron sensitive fluorescent material on the supporting plate 14 is maintained at a positive potential from a source of potential outside the tube wall. Sweep deflection control voltages are successively impressed on the deflection elements 22 by an electric generator shown diagrammatically in the drawing and described in detail in the above-referred to patent. Upon suitable energization of the deflection elements 22 establishing an electrostatic field negative with respect to the beam potential, the beam 12 will be caused to be deflected toward and impinge the fluorescent material coating on the supporting plate 14. In one successful embodiment of a deflection system of the type described seven transparent deflection elements 22 were utilized. Such disclosure is merely exemplary and is not to be understood as limiting as to the scope of the invention.

It will be noted that the coating on the supporting plate 14 is comprised of a plurality of longitudinal strips 24, 26 and 28 of fluorescent powders and the combination may hereinafter be referred to as the image screen. The coating is comprised of alternate longitudinal strips 24, 26 and 28 of fluorescent material which when excited by an impinging beam of electrons emits light of varying wave lengths which the human eye perceives as the additive primary colors of red, blue and green. In the embodiment shown in FIGURE 2, the strips are arranged in groups of red, blue and green light emitting fluorescent material and are coextensive with the supporting plate 14. The arrangement is cyclically repeated across the face of the plate 14 in such a manner that the strip 24 when excited by the impingement of electrons will emit red light. Strips 26 and 28 when excited by an impingement of electrons emit blue and green light, respectively. It appears that the width of each strip of phosphor may be in the order of 24 mils or .024 inch. For purposes of illustration, the relative size of the strips with respect to the deflection electrodes has been exaggerated, it being noted that it is not unusual to employ seven vertical electrodes for the entire target area of a fifteen inch tube.

The stability of the deflection system, as described in detail in the above-referred to patent, is of such a degree that by impressing the proper voltage on the transparent deflection elements 22 the beam 12 may be caused to strike a single strip of phosphor during a single scan of the beam across the face of the image screen. In view of the inherent focusing characteristics of the discussed deflection system, the beam of electrons can be caused to have a very small cross-sectional diameter. The size of the beam diameter at point of target impingement is an important feature of the tube concerning its ability to obtain a pure color display on the image screen. If the beam were permitted to "blow up" near the point of impingement on the image screen, the resultant color would be a mixture of colors due to the fact that the beam would be simultaneously bombarding and thereby exciting the fluorescent material of two or more adjacent strips.

Manifestly, in order to present an image in color on the face of the image screen, the three pictures which have been sent from the transmitter must be reassembled at the receiver. One method of achieving this result is to cause the electron beam to scan the entire face of the image screen in a manner whereby only the phosphor strips 24 emitting red light are struck and thereby excited by the beam, forming a red raster. During the next succeeding scanning operation, the beam will be caused to impinge only those phosphor strips 26 which emit blue light, thereby forming a blue raster. The next scanning operation only the phosphor strips 28 which emit green light will be caused to be excited by the beam of electrons. Acting under the control of the transmitting station, the beam 12 changes in intensity and thereby causes the spot of light emitted by the excited phopshor to effect a corresponding change in brightness as it moves along each strip and thus recreates the light and shadows of the original scene. Since the light spot on the image screen moves in precise step with the scanning process of the television camera, each dot of light falls in its proper place, and has its proper value of light or shade.

Obviously, the reassembling process of the receiver is accomplished so rapidly, a single primary color being emitted during each period of the beam sweep of individual strips of phosphor, that these colors are not perceived separately one after another, but appear to the viewer as a blend of the colors as though they existed simultaneously.

It will be noted in FIGURE 2 that the deflection elements 22 may be electrically connected to ground through variable condensers 30 for the purpose of simplifying registration of the first line scan controlled by each deflection electrode with the first strip associated therewith. The condensers 30 control the wave form or rise time of the varying potential wave applied to the deflection elements 22 and by adjusting the capacitance characteristics thereof, the registry of the beam impingement on the image screen may likewise be varied.

FIGURE 3 shows another embodiment of the invention utilizing the same electron beam deflection principles as shown and discussed with reference to FIGURE 2. However, in the embodiment illustrated in FIGURE 3, two electron gun arrangements 34 and 36 are provided to simultaneously or individually deliver electron beam 38 and 40, respectively, along the marginal edge of a supporting plate 42. The supporting plate 42 is preferably formed of a transparent electrically conducting material and suitably coupled to a source of potential positive with respect to the cathode potential. Deflection electrodes 31 are provided to deflect the beams 38 and 40 downwardly and in a plane parallel to the supporting plate 42. Two sets of accelerating and focusing electrodes are provided in the embodiment shown in FIGURE 3. A slotted accelerator electrode 32 and a focusing skirted electrode 33 are disposed such that the electron beam 38 emitted from the electron gun 34 is caused to travel through the electrodes 32 and 33. In a like manner, a slotted electrode 32*a* and a focusing skirted electrode 33*a* are disposed such that the electron beam 40 emitted from the electron gun 36 is caused to travel therethrough. The electrodes 32 and 32*a* are suitably energized to establish an accelerating electrostatic field on the electrons after they are deflected by the deflection electrodes 31. The electrostatic field causes the deflected electrons to be accelerated vertically downward toward the skirted focusing electrodes 33 and 33*a* which, in turn, cause electron beams 38 and 40 to be focused.

The beam 38 delivered by the electron gun 34 will be caused to travel parallel and adjacent to one surface of the supporting plate 42; and the beam 40 delivered by the electron gun 36 will travel parallel and adjacent to the opposite surface thereof.

The supporting plate 42 has one of its surfaces coated with a fluorescent material 46 which emits green light when excited by the bombardment of electrons. The opposite surface of the support 42 is coated with alternate longitudinal strips 48 and 49 of fluorescent material. The strips 48 are composed of fluorescent material which when excited by the bombardment of electrons will emit red light and the fluorescent material of the strips 49 will emit blue light, when excited by the bombardment of electrons.

In order to cause the electrons to strike the fluorescent coating on the surfaces of the supporting plate 42, transparent electrostatic deflection means are provided. Deflection elements 35 are disposed parallel to and spaced from the surface of the supporting plate 42 which is coated with the plurality of strips 48 and 49 of the different fluorescent material, which fluoresce red and blue light, respectively. The electron beam 38 is caused to travel in a plane which is intermediate the deflection electrodes 35 and the fluorescent strips 48 and 49. Upon suitable energization of the deflection elements 35, the beam will be caused to impinge on the fluorescent strips 48 or 49 thereby forming either a red raster or a blue raster.

Similar transparent deflection elements 35*a* are provided to cause the electron beam 40 to be deflected such that it will impinge or strike the fluorescent coating 46. The deflection elements 35*a* are parallel to and slightly spaced from the phosphor coating 46 thereby providing a space wherein the electron beam 40 may travel along a plane intermediate the deflection elements and image screen. Upon suitable energization of the deflection elements 35*a*, the beam will be caused to impinge on the coating 46 thereby forming a green raster.

It must be pointed out that the fluorescent material employed in the embodiment shown in FIGURE 3 is transparent. With the utilization of transparent fluorescent powders, transparent supporting plate 42, and transparent deflection elements 35*a*, the image exhibited on the screen may be readily viewed from a position facing the phosphor coating 46. If in addition to forming the deflection elements 35*a* of a transparent material, the deflection elements 35 are likewise formed of transparent material, the image exhibited by the arrangement may be viewed from either side of the entire assemblage.

Further, it can be readily discerned that the broadcasted or transmitted signal must be dissected in a manner whereby the signal corresponding to the green color of the original scene is, for example, impressed on the electron gun 36; next the portion of the signal corresponding to the blue color of the original scene is impressed on the electron gun 34, and finally the signal corresponding to the red color of the scene is impressed on the electron gun 34 after the blue signal has been utilized to obtain a complete scan throughout the blue fluorescent strips 49. The complete scanning procedure is accomplished so rapidly that the viewer is unable to independently view each color separately but perceives a resultant picture in full color comprising, in effect, a visual superimposition of the individual single color pictures.

A third embodiment of the invention is shown in FIG-

URE 4. The horizontal deflection system comprises a plurality of deflection elements 50 spaced from and substantially coextensive with a marginal edge of a supporting plate 53. A slotted accelerator electrode 51 is disposed beneath and spaced from the deflection elements 50. A skirted focusing electrode 52 is disposed beneath and spaced from the accelerator electrode 51.

The image screen is formed of a supporting plate 53 of an optically transparent electrically conducting material and is provided with a coating of fluorescent material. The fluorescent coating comprises a plurality of strips 54, 55 and 56 capable of emitting light of the various additive primary colors red, green, and blue respectively. The strips are cyclically repeated across the entire face of the supporting plate 53 in the following order; red, green, blue, green, red, green, etc.

The vertical deflection system comprises a plurality of transparent deflection elements 57 which are spaced from and parallel to the fluorescent material of image screen. Interposed between the deflection elements 57 and the image screen, there is an electron lens arrangement comprised of grid wires 60 and 61. An electron gun 58 is adapted to deliver a beam of electrons 59 along a path substantially parallel to the horizontal deflection elements 50. Upon suitable energization of the horizontal deflection elements 50, the electrons of the beam 59 are caused to be deflected toward the image screen. The deflected beam is caused to be accelerated and focused by the electrodes 51 and 52, respectively. The beam 59 is then caused to travel in the zone or region formed between the electron lens arrangement and the vertical deflection elements 57. Upon suitable energization of the vertical deflection elements 57 the beam 59 will be caused to be deflected through the electron lens arrangement and impinge upon the image screen.

The electron lens arrangement comprises a series of grids connected and disposed to form a plurality of converging electron lenses which supplementally focus the electron beam to a small spot at its point of impingement on the image screen. Specifically, each lens is formed by a pair of wire grids 60 and 61 which are arranged to be electrically energized by the signal output of a variable voltage generator. The target or image screen is maintained positive with respect to the grid sets 60 and 61.

In addition to focusing the beam according to the above method, the beam, after being deflected by the deflection elements 57, can be switched to strike the individual fluorescent strips 54 or 56 by means of proper switching voltages applied to the grid wires 60 and 61 of each set. The grid wires 60 and 61 are mutually insulated from one another.

In operation of the grid wires 60 and 61, when equal potential is applied to the grid wires simultaneously, the electron beam 59 will be caused to strike the strips 55 which produce green light. If a differential voltage is applied so as to render the wire 60 negative with respect to grid wire 61, the beam will strike the strips 56 producing blue light; and if, on the other hand a differential voltage is applied so as to render the grid wire 61 negative with respect to grid wire 60, the beam will be deflected to strike the strips 54 producing red light. The combination of the focusing principle and the grid switching, in conjunction with a correctly adjusted location of the fluorescent color strips on the image screen with respect to the meshes of the grid, results in a high degree of color registration.

FIGURE 5 shows another embodiment of the invention employing two electron guns, one for energizing the fluorescent coatings on each side of a transparent supporting plate. The image screen of this embodiment is substantially identical with the image screen illustrated and described with reference to FIGURE 3. Two electron guns 62 and 63 are provided which are adapted to deliver electron beams 64 and 65, respectively, along the marginal edge of a supporting plate 66. The supporting plate 66 is preferably formed of a transparent electrically conducting material and electrically coupled to a source of potential positive with respect to the cathode potential, which potential source is disposed outside the tube wall as diagrammatically shown in the drawing. Deflection electrodes 67 are provided to deflect the beams 64 and 65 along a path adjacent to and in a plane parallel to the supporting plate 66. The electron beams 64 and 65 are caused to pass through the slotted accelerator electrodes 71 and **71*a*, respectively, and the skirted focusing electrodes 72 and 72*a*, respectively. The beam 64 delivered by the electron gun 62 will be caused to travel parallel and adjacent to one surface of the supporting plate 66 and the beam 65 delivered by the electron gun 63** will be caused to travel along a path parallel and adjacent to the opposite surface thereof.

A transparent fluorescent material 68 is coated on one surface of the supporting plate 66 and has the characteristic of emitting green light when excited by the bombardment of electrons. The opposite surface of the supporting plate 66 is coated with a plurality of alternate longitudinal strips 69 and 70 of transparent fluorescent material capable of emitting red and blue light, respectively, when excited by the bombardment of electrons.

Electrostatic deflection means are provided to cause the beams of electrons to strike their respective fluorescent coatings. Transparent deflection elements 73 are disposed parallel to and spaced from the surface of the supporting plate 66 which is coated with a fluorescent coating 68. Similar deflection elements 74 are disposed parallel to and spaced from the surface of the supporting plate 66 which is coated with the plurality of strips 69 and 70. Upon suitable energization of the deflection elements 73 and 74 negative with respect to the cathode potential, the electron beams will be caused to be deflected toward and impinge on their respective fluorescent coating.

It must be pointed out that the electron beam 64 after being deflected into the zone adjacent the fluorescent strips 69 and 70 is directed along a path between the deflection elements 74 and an electron lens arrangement similar to that described with reference to FIGURE 4. The electron lens arrangement is employed to obtain auxillary or supplemental focusing and registration of the beam at its point of impingement on the image screen. The electron lens arrangement comprises a series of converging electron lenses near the image screen and more particularly the arrangement is disposed intermediate the deflection elements 74 and the image screen which is made up of the plurality of fluorescent strips 69 and 70. Specifically, each lens is formed of a pair of wire grids 75 and 76 arranged to be electrically energized by the signal output of a variable voltage generator. The target or image screen is maintained positive with respect to the grid sets 75 and 76 thereby acting to form a series of converging electron lenses, one between each adjacent set of grid wires 75 and 76 and the supporting plate 66.

In addition to focusing the beam according to the above method, the beam, after being deflected by the deflection elements 74 can be switched to strike the individual fluorescent strips 69 or 70 by means of proper switching voltages applied between the interleaved groups of grid wires 75 and 76. These grid wires 75 and 76 are mutually insulated from one another.

In operation, when equal potential is applied to the grid wires 75 and 76 simultaneously, the electron beam 64 will be caused to strike the strips 70 which will produce blue light. If a differential voltage is applied so as to render the grid wire 75 positive with respect to the grid wire 76, the beam will strike the strips 69 producing red light. The combination of the focusing principle and the grid switching, in conjunction with a correctly adjusted location of the fluorescent color strips on the image screen with respect to the meshes of the grids, results in a high degree of color registration. A voltage source is provided to energize each individual group of grid wires and is situated outside the tube structure as diagrammatically shown in the drawing.

The description of the embodiments shown in FIGURES 3 and 5 refer to the utilization of individual electron guns of the conventional type, one to energize separate fluorescent coatings on each surface of the image screen. However, it is not necessary to employ individual electron guns. With the arrangement shown in FIGURES 3 and 5, a single electron gun may be utilized to scan both image producing surfaces by applying an appropriate signal to suitable beam deflecting elements.

FIGURE 6 shows an Aiken-type cathode ray tube for use in color display wherein there is an electron sensitive material coated on the surface of an electrically conductive supporting plate 90. An electron beam source 91, which may be an electron gun of conventional design, is arranged above and spaced from the electron sensitive coating and positioned relative thereto to impart to the electron beam 92 an initial trajectory in substantially parallel relation with respect to the surface of the supporting plate 90 on which the electron sensitive material is coated.

The electron gun 91 is provided with a pair of electrostatic deflection plates 93 which upon suitable potential energization with respect to the beam potential will cause the beam 92 to be deflected throughout a plane which is in parallel relation with respect to the surface of the supporting plate 90 and in close proximity therewith.

The vertical sweep deflection system illustrated in FIG. 6 comprises a plurality of transparent electrically conducting deflection elements 94 arranged substantially parallel and adjacent to the supporting plate 90 and spaced therefrom a distance to permit passage of the electron beam 92 therebetween. The electron sensitive fluorescent material on the supporting plate 90 is maintained at a positive potential with respect to the beam potential from a source of potential outside the tube wall. Sweep deflection control voltages are successively impressed on the deflection elements 94 by an electric generator shown diagrammatically in the drawing and described in detail in the above-referred-to co-pending applications. Upon suitable energization of the deflection elements 94 establishing an electrostatic field negative with respect to the beam potential, the beam 92 will be caused to be deflected toward and impinge upon the fluorescent material coating on the supporting plate 90. In one successful embodiment of a deflection system of the type described, seven transparent deflection elements 94 were utilized. Such disclosure is merely exemplary and is not to be understood as limiting as to the scope of the invention.

It will be noted that the coating of the supporting plate 90 is comprised of a plurality of longitudinal strips 95, 96 and 98 of fluorescent powders and the combination will hereinafter be referred to as the image screen. The coating is comprised of alternate strips 95, 96 and 98 of fluorescent material which when excited by an impinging beam of electrons emits light of varying wave-lengths which the eye perceives as the additive primary color of red, green and blue, respectively. In the embodiment shown in FIGURE 6, the strips are arranged in groups of red, blue and green light emitting fluorescent material and are coextensive with the supporting plate 90. The arrangement is cyclically repeated across the face of the supporting plate 90 in such a manner that the strip 95 when excited by the impingement of electrons will emit red light. The strips 96 and 98 when excited by an impingement of electrons emit green and blue light. The width of each strip of phosphor of fluorescent material may be in the order of 24 mils or .024". For purposes of illustration, the relative size of the strips with respect to the deflection electrodes 94 has been exaggerated, it being noted that it is not unusual to employ seven vertical electrodes for an entire target area of a 15" tube.

The stability of the deflection system is of such a degree that by impressing the proper voltage value on the transparent deflection elements 94 the beam 92 may be caused to strike a single strip of phosphor during a single scan of the beam across the face of the image screen.

FIGURE 7 shows an Aiken-type cathode ray tube having a target comprising an electron sensitive coating disposed on the surface of an electrically conducting supporting plate 100. An electron beam source 101, which may be an electron gun of the conventional design, is arranged above and spaced from the upper horizontal marginal edge of the target and positioned relative thereto to impart to the emergent electron beam 102 an initial trajectory in substantially parallel relation with respect to the surface of the supporting plate 100 on which the electron sensitive material is coated.

The electron gun 101 is provided with a pair of electrostatic deflection plates 103 which upon suitable potential energization with respect to the beam potential will cause the beam 102 to be deflected throughout a plane which is in parallel relation with respect to the surface of the supporting plate 100 and in close proximity therewith.

The vertical sweep deflection system illustrated in FIGURE 7 comprises a plurality of a transparent electrically conducting deflection elements 104 arranged substantially parallel and adjacent to the supporting plate 100 and spaced therefrom a distance to permit passage of the electron beam therebetween. Interposed between the deflection elements 104 and the fluorescent coating on the supporting plate 90, there is an electron lens arrangement comprised of grid wires 105 and 106. The electron beam 102 is caused to travel in the zone or region formed between the electron lens arrangement and the vertical deflection elements 104. Upon suitable energization of the vertical deflection elements 104, the beam 102 will be caused to be deflected through the electron lens arrangement and impinge upon a fluorescent coating of the supporting plate 100.

The electron lens arrangement comprises a series of grids connected and disposed to form a plurality of converging electron lenses which supplementally focus electron beam to a small spot at its point of impingement on the image screen. Specifically, each lens is formed by a pair of grid wires 105 and 106 which are arranged to be electrically energized by the signal output of their variable voltage generator. The target or image screen is maintained positive with respect to the grid sets 105 and 106.

In addition to focusing the beam according to the above method, the beam, after being deflected by the deflection elements 104, can be switched to strike the individual fluorescent strips 107, 108, or 109 by means of proper switching voltages applied to the grid wires 105 and 106 of each set. The grid wires 105 and 106 are mutually insulated from one another.

The fluorescent coating on the supporting plate 100 is comprised of a plurality of longitudinal strips 107, 108 and 109 of fluorescent powders and the combination will hereinafter be referred to as the image screen. The coating comprised of alternate strips 107, 108 and 109 of fluorescent material, when excited by an impinging beam of electrons emits light of varying wave-lengths which the eye perceives as, for example, the primary colors of red, green and blue. In the embodiment shown in FIGURE 7, the fluorescent strips are arranged in groups which are cyclically repeated across the face of the supporting plate 100 in such manner that the strip 107 when excited by the impingement of electrons will emit red light. The strips 108 and 109 when excited by an impingement of electrons will emit green and blue light, respectively. The width of each strip of phosphor or fluorescent material may be in the order of 24 mils or .024 inch. For purposes of illustration, the relative size of the strips with respect to the deflection plates or electrodes 104 has been exaggerated, it being noted that it is not unusual to employ seven vertical deflection electrodes for an entire target area of a fifteen inch tube.

In operation, the electron beam 102 is caused to sweep the zone or region formed between the electron lens arrangement and the vertical deflection elements at 104. Upon suitable energization of the vertical elements 104, the beam 102 will be caused to be deflected through the electron lens arrangement and impinge upon the image screen. When equal potential is applied to the grid wires simultaneously, the electron beam 102 will be caused to strike the strips 108 which produce green light. If a differential voltage is applied so as to render the grid wire 105 negative with respect to grid wire 106, the beam will strike the strips 109 producing blue light and if on the other hand the differential voltages applied so as to render grid wire 106 negative with respect to grid wire 105, the beam will be deflected to strike on strips 107 producing red light. The combination of the focusing principle and the grid switching, in conjunction with a correctly adjusted location of the fluorescent color strips of the image screen with respect to the meshes of the grid results in a high degree of the color registration.

FIGURE 8 shows another embodiment of the invention comprising a supporting plate 110 which is of substantially transparent and electrically conducting material, such as glass. One surface of the supporting plate 110 is adapted to carry a coating of fluorescent material 111 which is capable of emitting the light of a color such as green for example when excited by an impinging beam of electrons. The other surface is adapted to carry a fluorescent coating comprised of a plurality of strips 112 and 113 of fluorescent material. The strips 112 and 113 are capable of emitting light of other colors such as red and blue, for example, upon impingement by an impinging beam of electrons. The composite unitary assembly of the supporting plate 110, and the fluorescent coatings 111, 112 and 113 may be referred to as the image screen.

Electron gun 114 is disposed in spaced relation of the upper horizontal marginal edge of the image screen. The electron gun 114 is provided with two sets of deflection elements 115 and 116 which are adapted to achieve the desired deflection of the emergent electron beam 117 upon suitable energization from an electric generator. The set of deflection elements 115 achieve deflection of the beam 117 to regions or zones adjacent and substantially parallel to the fluorescent coatings of the image screen. The set of deflection elements 116 are provided to apply deflecting forces to the beam 117 causing it to be deflected on whichever surface of the image screen is to be scanned thereby.

Vertical deflection elements 118 are provided to be disposed parallel to and slightly spaced from the fluorescent coating 111 and are suitably energized from an electric generator outside the tube envelope. The elements 118 are formed of an optically transparent and electrically conductive material, such as glass. Similar deflection elements 119 are provided to be disposed in a like manner parallel to and spaced from the opposite surface of the image screen provided with the strips 112 and 113 of fluorescent material. The elements 119 are likewise energized from the electric generator situated outside the tube envelope.

A plurality of grid sets, each set comprising grid wires 120 and 121, is disposed between the strips 112 and 113 and the deflection elements 119. The grid wires 120 and 121 are mutually insulated and are energized from a variable voltage generator outside the tube envelope. When equal potential is applied to the grid wires 120 and 121 simultaneously, the electron beam 117 will be caused to strike the strips 113 which will produce blue light. If differential voltages are applied so as to render the grid wire 120 negative with respect to the grid wire 121, the beam will strike the strips 112 producing red light. The combination of the focusing principal and the grid switching, in conjunction with the correctly adjusted location of the fluorescent color strips on the image screen with respect to the meshes of the grid, result in a high degree of color registration.

By way of illustration, the disposition of the fluorescent material on the supporting plates has been shown in FIGURES 3, 5 and 8 as having strips of red and blue light emitting phosphors deposited on one surface and green light emitting phosphors deposited on the opposite surface. However, it is to be understood that a rearrangement of the fluorescent coatings, such as having red and green light emitting strips of fluorescent material on one surface and the blue light emitting fluorescent material on the opposite surface is within the scope of the invention. Of course, it must be realized that other combinations of light emitting phosphors and other arrangements of the coatings are likewise within the contemplation of the invention.

It may be advantageous in certain applications of the invention to utilize light filters in combination with the fluorescent material coating of the target or image screen. In such instances, fluorescent material capable of emitting polychromatic light would be employed with a filter glass interposed between the fluorescent coating and the viewer. The filters, thus employed, only permit the passage of light having a predetermined wave-length and adsorbs the light having any other than the predetermined wavelength. An additional advantage achieved by the utilization of filters in combination with a polychromatic light emitting fluorescent material, is the inherent ability to thereby achieve a relatively dark background.

While I have described and shown what I regard to be preferred embodiments of my invention, it will be appreciated that various changes, rearrangements and modifications may be made therein without departing from the scope of the invention, as defined by the appended claims.

What is claimed is:

1. A cathode ray tube having a target including a plurality of sets of strips of fluorescent material arranged in a predetermined pattern on a face of said target, the strips of different sets being effective as excited to provide a different color output, means for delivering a beam of electrons along a marginal edge of said screen, horizontal deflection means provided along said marginal edge for successively deflecting said beam to a zone adjacent said screen, and means disposed adjacent said face of said screen for deflecting said beams on said screen into registration with said different strips.

2. A cathode ray tube having a viewing screen, one surface of said screen provided with a coating of fluorescent material capable of emitting light of one of the primary colors, the other surface of said screen provided with a plurality of sets of strips of fluorescent material capable of emitting light of the several other colors, the strips of different sets being effective as excited to provide a different color output, an electron beam source means adapted to deliver a beam of electrons along a parallel path adjacent a marginal edge of said screen, horizontal deflection means provided along said marginal edge for successively deflecting said electron beam to a zone adjacent each of said surfaces, and means disposed adjacent each of said surfaces for deflecting said electron beam into registration with the adjacent surfaces on said screen.

3. A cathode ray tube having a viewing screen provided with a plurality of strips of fluorescent material disposed in parallel relation across at least one face of said screen, said strips forming a plurality of red, blue, and green zones arranged systemmatically across one dimension of the face of said screen in a repeating pattern, means for delivering a beam of electrons along a marginal edge of said screen, horizontal deflection means provided along said marginal edge for successively deflecting said beam to a zone adjacent said screen, an electron lens arrangement disposed adjacent said screen, and means for controlling deflection of said beam through said electron lens for focusing thereby with the different zones on said screen.

4. A cathode ray tube having a viewing screen, one surface of said screen being provided with a coating of fluorescent material capable of producing light of one of the three colors additive to produce white light, the other surface of said screen being provided with a plurality of sets of strips of fluorescent material, the different sets being capable of producing light of a different one of said additive colors and arranged in cyclic order across the face of said screen, a source of electrons adapted to deliver electrons along paths adjacent a marginal edge of said screen, horizontal deflection means provided along said marginal edge for successively deflecting said electrons to zones adjacent each of said surfaces, an electron lens arrangement disposed adjacent said second-mentioned surface, and means disposed in substantially co-extensive relation and spaced from each of said surfaces for deflecting said beam on said screen.

5. A cathode ray tube having an optically transparent viewing screen having coated thereon a plurality of sets of strips of fluorescent material disposed in parallel relation in a cyclic order on a face thereof each set being effective to produce light under electron bombardment observable in one of three colors additive to produce white light, different sets as excited providing a different one of said colors, means for delivering a beam of electrons along a marginal edge of said screen, horizontal deflection means provided in a parallel spaced relation along said marginal edge for successively deflecting said beam to a zone adjacent said screen, and optically transparent electrostatic deflection electrodes disposed adjacent the face of said screen for causing said beam to be deflected and impinge on said screen.

6. A color television tube having an optically transparent viewing screen provided with a coating of fluorescent material on one surface thereof from which light of one of the additive primary colors will emanate when excited by electron bombardment, the other surface of said screen being provided with a plurality of sets of strips of fluorescent material arranged cyclically across the face of said surface, each set being of a material from which light of a different one of the additive primary colors will emanate when excited by electron bombardment, means for delivering electrons along a path parallel and adjacent to a marginal edge of said screen, means for deflecting said electrons to zones adjacent said first and second mentioned surfaces, and optically transparent electrodes disposed in parallel spaced relation to said first and second mentioned surfaces for effecting deflection of said electrons on said surfaces.

7. An electron space discharge device having at least one target at least a portion of which comprises a plurality of sets of strips of fluorescent material arranged in a continuous, uninterrupted pattern on one face of the target, each different set being effective as excited to provide a different color output, an electron beam source for delivering a beam in substantially parallel and adjacent spaced relation with said target strips, and means for applying at different time to different intervals along the parallel portion of the beam, deflecting forces to deflect same into registration with the different strips on said target.

8. An electron space discharge device having at least one target, at least a portion of which comprises a plurality of sets of strips of fluorescent material arranged in a continuous, uninterrupted pattern on one face of said target, each different set being effective as excited to provide a different color output, an electron beam source for delivering a beam in adjacent spaced relation with said target strips, and means for applying deflecting forces to said beam selectively at different intervals of the beam to deflect same into individual registration with each one of the different strips on said target.

9. An electron space discharge device having at least a first and a second target disposed in superposed relation, at least one of said targets being provided with a coating of fluorescent material capable of emitting light of one color, and at least one of the other targets being provided with a plurality of sets of strips of fluorescent material capable of emitting light of other colors, each different set of strips providing a different color output responsive to the excitation thereof, an electron beam source means for delivering a beam along a path in adjacent spaced and parallel relation with each of said targets, and means for deflecting the beam from its path into registration with each of said targets.

10. An electron space discharge device having at least a first and a second target, at least one of said targets being provided with a coating of fluorescent material capable of emitting light in one color, and at least one of the other targets being provided with a plurality of sets of strips of fluorescent material capable of emitting light of other colors, each different strip set being effective as energized to provide a different color output, an electron beam source means for delivering a beam along a path in adjacent spaced relation with each of said targets, means for deflecting the beam from its path adjacent the other target into registration with the different strips on said other target, and means for deflecting the beam from the path adjacent the said one target to positions thereon which are in superposed relation with the registration of the beam on said other target.

11. An electron space discharge device having at least a first and a second target, at least one of said targets being provided with a coating of fluorescent material capable of emitting light of one color, and at least one of the other targets being provided with a plurality of sets of strips of fluorescent material on one surface thereof capable of emitting light of other colors, each different set of strips being effective as energized to provide a different color output, an electron beam source means for delivering a beam along a path in adjacent spaced and parallel relation with each of said targets, means operable to sweep said beam within the plane parallel to said targets, and means for deflecting the beam from its paths adjacent said targets into successive registration with each of said targets.

12. An electron space discharge device having a target comprising a plurality of sets of strips of fluorescent materials arranged in a given pattern on one surface thereof, different sets being effective as energized to provide a different color output, an electron beam source for delivering a beam along a path substantially in parallel relation with said target, an electron lens disposed between said beam path and said target, and means for deflecting said beam from said path and through said electron lens into selective registration with the different ones of said target strips.

13. An electron space discharge device having at least a first and a second target, at least one of said targets being provided with a coating of fluorescent material capable of emitting light of one color, at least one other of the targets being provided with a plurality of sets of strips of fluorescent material on one surface thereof capable of emitting light of other colors, each different set being operative as energized to provide a different color output, means for mounting said targets in substantially juxtapositioned relation, the fluorescent material of at least the forward one of the targets being of a material which is at least semitransparent, an electron beam source for delivering a beam in a zone which is in adjacent spaced relation with each of said targets, and deflection means for each target for deflecting the beam from said paths into registration with the adjacent target, the deflection means for at least the forward target being of a transparent conducting material.

14. An electron space discharge device having a target provided with a plurality of strips of fluorescent material disposed in parallel relation across at least one face of said target, said strips forming a plurality of red, blue and green zones arranged systematically across the face of said target in an uninterrupted repeating pattern, deflection means disposed adjacent and in spaced relation with the face of said target, an electron beam source for delivering a beam between said deflection means and said target, and means for connecting energizing signals to said deflection means to effect deflection of the beam into selective registration with each of the strips on said target.

15. An electron space discharge device having at least one target, an electron beam source for delivering a beam adjacent said target, deflection means including a plurality of deflection members arranged to apply deflecting forces to said beam to bend same into registration at different intervals on said target, means for applying deflecting signals to said deflection means, and means for preadjusting an electrical characteristic of at least one of said deflection members to thereby preadjust the point of registration of the beam on said target to a predetermined point responsive to the application of the deflecting signal to said deflection member.

16. An electron space discharge device having at least one target having a surface including a plurality of strips of different fluorescent materials for providing different colors arranged in a given pattern, an electron beam source for delivering a beam adjacent said target, deflection means including a plurality of deflection members arranged to apply deflecting forces to said beam to bend same into registration at different intervals on each of the strips on said target, means for applying deflecting signals to said deflection members, and means for preadjusting an electrical characteristic of at least one of said deflection members to correspondingly adjust the point of registration of the beam on said target relative to at least one of the target strips responsive to the application of the deflecting signal to said deflecting member.

17. An electron space discharge device having at least one target including a plurality of strips of different fluorescent materials for providing different colors arranged in a given pattern on a surface of said target, an electron beam source for delivering a beam adjacent said target, deflection means including a plurality of deflection members arranged to apply deflecting forces to said beam to bend same into registration at different intervals on said target, means for applying deflecting signals to said deflection members, and means for variably adjusting the capacitance of at least one of the deflection members to thereby preadjust the point of registration of the beam on said target relative to at least one of the target strips which is influenced by said one deflection member.

18. An electron space discharge device having at least a first and a second target, at least one target being provided with a coating of fluorescent material capable of emitting light of one color, at least one other target being provided with a plurality of sets of strips of fluorescent materials capable of emitting light of other colors on a surface thereof, each different set being effective to provide a different color output as energized, an electron beam source for delivering a beam in adjacent spaced relation with each of said targets, deflection means for each target for deflecting each of said beams into registration with its associated target, and means for connecting the deflection means of each of said targets in multiple to a common energizing source to thereby accomplish superposed registration of the beams on the respective targets.

19. An electron space discharge device having a target, an electron beam source for delivering a beam along a path in adjacent substantially parallel relation with said target, electron lens means comprising a plurality of pairs of grids disposed between said beam path and said target, and means for deflecting said beam from said path at different intervals through the correspondingly different grid pairs for focusing thereby on said target.

20. An electron space discharge device having a target provided with a plurality of groups of strips of fluorescent material, an electron beam source for delivering a beam along a path in adjacent spaced relation with said target, electron lens means comprising a plurality of pairs of grids, each pair of grids being disposed in a negative position to a corresponding preassigned one of said groups of strips between said beam path and said target, each different grid pair being positioned in spaced relation with a correspondingly different group of strips and means for deflecting said beam from its path at different intervals into the zone of the correspondingly different grid pairs for focusing thereby on said target.

21. An electron space discharge device having a target provided with a plurality of groups of strips of fluorescent material, an electron beam source for delivering a beam along a path in adjacent spaced relation with said target, electron lens means comprising a plurality of pairs of grids, a pair for each of said groups of strips being disposed between said beam path and said target, means for controlling deflection of the beam between a pair of said grids, and means for applying signals to said pair of grids to control same to register the beam with the one of the strips in said group indicated by the signal on said pair of grids.

22. An electron space discharge device having a target provided with a plurality of groups of strips of fluorescent material, an electron beam source for delivering a beam along a path in adjacent spaced relation with the marginal edge of said target, means for deflecting the beam into a zone adjacent the fluorescent material on said target, electron lens means comprising a plurality of pairs of grids, each pair being assigned for use with a different one of said groups of strips and being disposed between said beam path and said target, means for controlling deflection of the beam from said zone into a pair of grids, and means for controlling each pair of grids to register the beam with the strip of its associated group as indicated by the signal on said pair of grids.

23. A cathode ray tube having a viewing screen provided with a plurality of strips of fluorescent material disposed in parallel relation across at least one face of said screen, said strips forming a plurality of red, blue, and green zones arranged systematically across one dimension of the face of said screen in a repeating pattern, means for delivering a beam of electrons to a zone adjacent said screen, an electron deflection arrangement disposed adjacent said zone, and means for controlling said beam to be successively deflected through correspondingly different sections of said electron deflection arrangement for focusing thereby with one of the zones on a corresponding section of said screen.

24. A cathode ray tube having a target including a plurality of sets of strips of fluorescent material arranged in a predetermined pattern on a face of said target, the strips of different sets being effective as excited to provide a different color output, means for delivering a beam of electrons along a marginal edge of said target, horizontal deflection means provided along said marginal edge for successively deflecting said beam to a zone adjacent said target, and means disposed adjacent said face of said target for selectively deflecting said beam toward said target and into registration with a predetermined set of said strips.

25. An electron space discharge device having at least one target, at least a portion of which comprises a plurality of sets of strips of fluorescent material arranged in a continuous, uninterrupted pattern on one face of the target, each different set being effective as excited to provide a different color output, an electron beam source for delivering a beam in substantially parallel and adjacent spaced relation with said target strips, and means for applying at different times to different intervals along the parallel portion of the beam, deflecting forces to selectively deflect the beam into registration with a predetermined set of said strips on said target.

26. An electron discharge device comprising a target electrode structure comprising a plurality of individual target members distributed in a predetermined geometrical pattern; electron gun means for projecting a focused beam of electrons along a predetermined reference path adjacent said target electrode structure; a first scanning electrode system comprising a plurality of reflector electrodes distributed along said reference path at predetermined intervals for selectively reflecting said electron beam along any of a multiplicity of secondary paths extending from said primary reference path in a plane substantially parallel to said target electrode structure, and a second scanning electrode system, comprising a plurality of scanning electrodes distributed along said secondary paths, for selectively directing said electron beam along any one of a multiplicity of tertiary beam paths individually intercepting said target members.

References Cited in the file of this patent

UNITED STATES PATENTS

| | | |
|---|---|---|
| 1,962,873 | Parker | June 12, 1934 |
| 2,272,842 | Hickok | Feb. 10, 1942 |
| 2,446,440 | Swedlund | Aug. 3, 1948 |
| 2,449,558 | Lanier et al. | Sept. 21, 1948 |
| 2,606,303 | Bramley | Aug. 5, 1952 |
| 2,795,729 | Gabor | June 11, 1957 |
| 2,795,731 | Aiken | June 11, 1957 |

FOREIGN PATENTS

| | | |
|---|---|---|
| 812,497 | France | Feb. 1, 1937 |